No. 643,349. Patented Feb. 13, 1900.
W. H. FAUBER.
BICYCLE CRANK SHAFT.
(Application filed Nov. 18, 1895.)
(No Model.) 2 Sheets—Sheet 1.
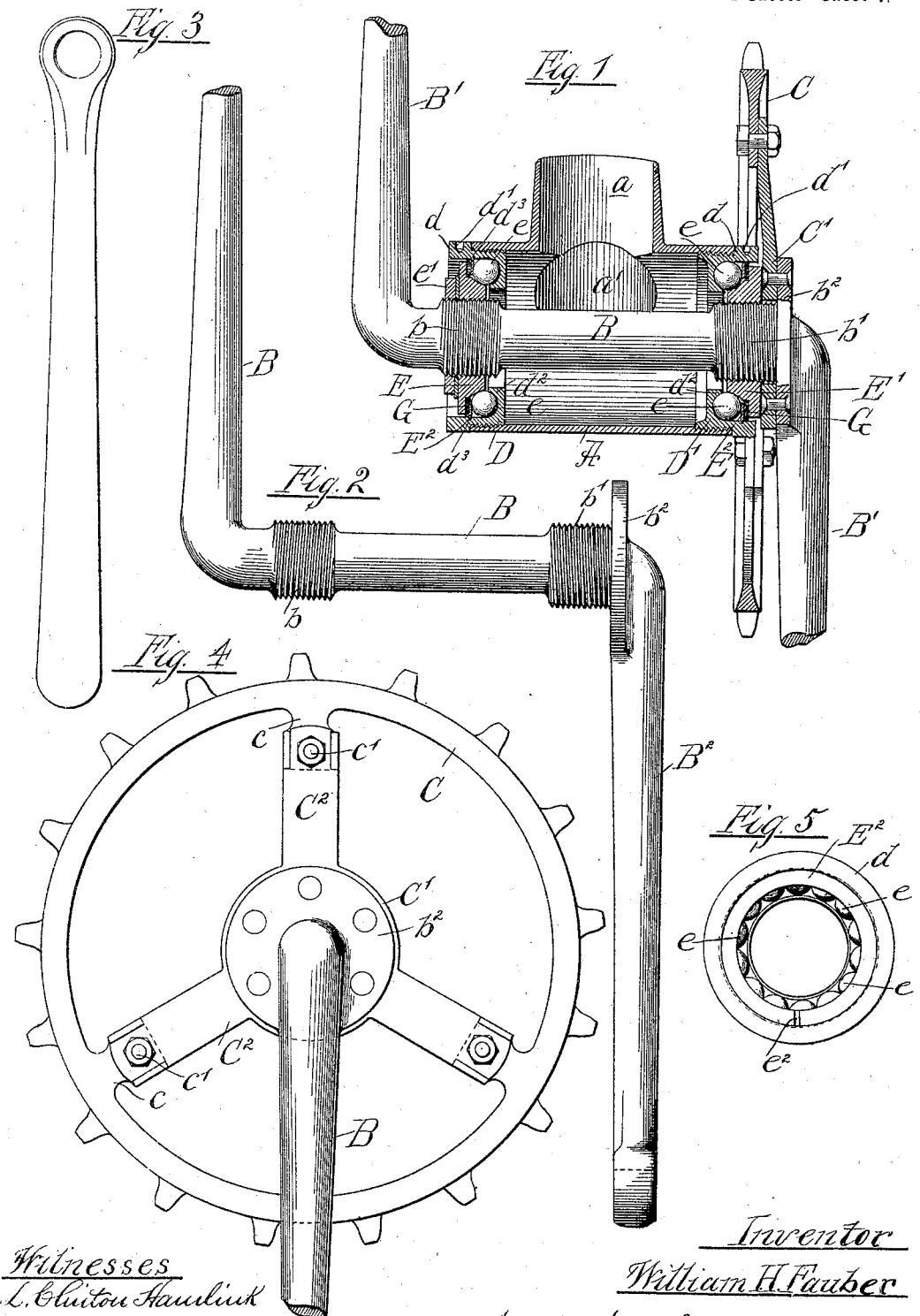
Witnesses
L. Clinton Hamlink
John W. Adams
Inventor
William H. Fauber
By: Dayton, Poole & Brown
his Attorneys
THE NORRIS PETERS CO., PHOTO-LITHO., WASHINGTON, D. C.

No. 643,349. Patented Feb. 13, 1900.
W. H. FAUBER.
BICYCLE CRANK SHAFT.
(Application filed Nov. 18, 1895.)
(No Model.) 2 Sheets—Sheet 2.
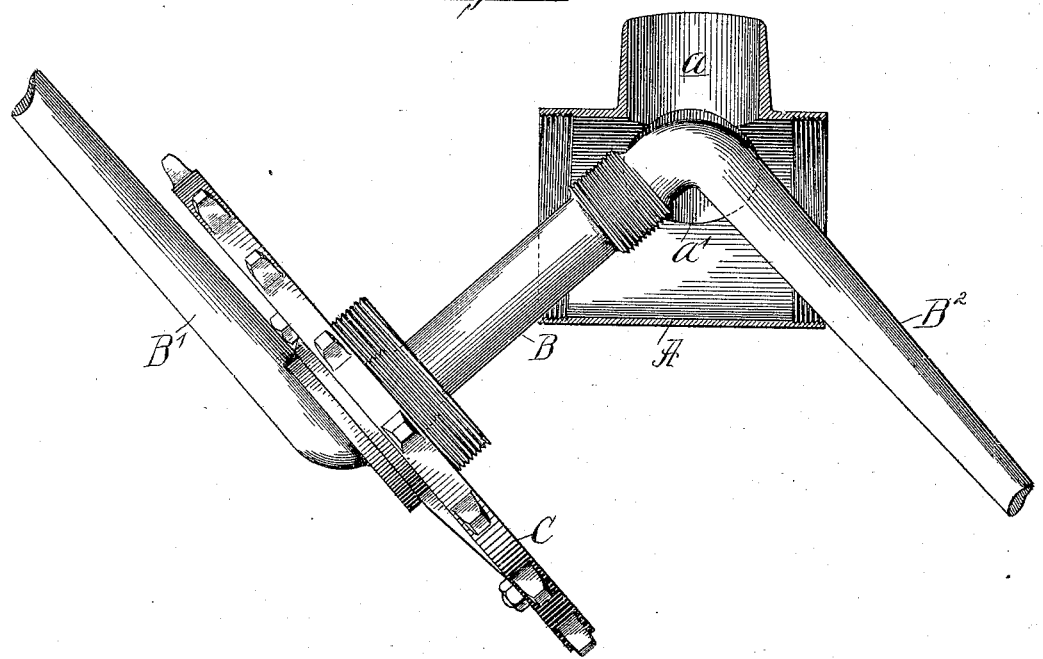
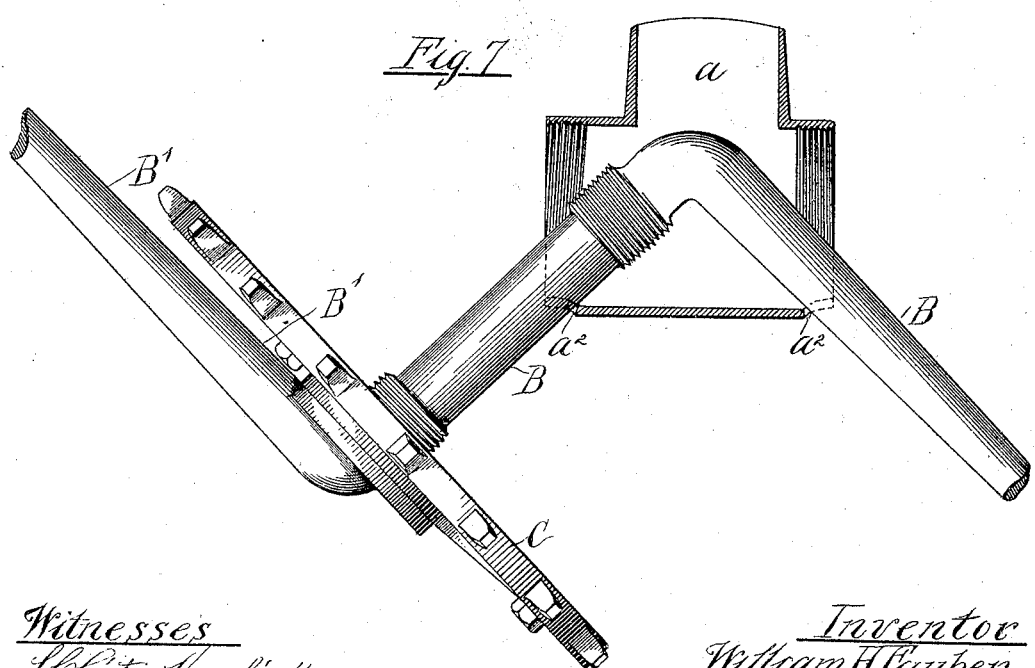

UNITED STATES PATENT OFFICE.

WILLIAM H. FAUBER, OF CHICAGO, ILLINOIS.

BICYCLE CRANK-SHAFT.

SPECIFICATION forming part of Letters Patent No. 643,349, dated February 13, 1900.

Application filed November 18, 1895. Serial No. 569,316. (No model.)

*To all whom it may concern:*

Be it known that I, WILLIAM H. FAUBER, of Chicago, in the county of Cook and State of Illinois, have invented certain new and useful Improvements in Bicycle Crank-Shafts; and I do hereby declare that the following is a full, clear, and exact description thereof, reference being had to the accompanying drawings, and to the letters of reference marked thereon, which form a part of this specification.

This invention relates to improvements in the crank-shafts of bicycles and ball-bearings therefor, and more especially to crank-shafts of that kind shown in my prior patent, No. 492,959, dated March 7, 1893, wherein the crank-shaft and its arms are made in one piece or integral with each other and in which those parts of the shaft and crank-arm exterior to the bearings are made in all parts smaller in size than the diameter of the shaft at the place where the inner ring or cone of the bearing is secured thereto, so that the parts of the bearings may be removed from the shaft by passing them over the crank-arm. In said prior patent the sleeve or hanger of said machine-frame is not a complete ring or annulus, but is provided with a lateral opening for the insertion or removal of the shaft, and the shaft-bearings embrace stationary annular parts which are detachably secured to the sleeve ends, so that when removed therefrom the shaft may be removed laterally through said opening in the hanger.

I propose to provide a crank-axle made integral with its crank-arms, as described, with an integral flange at one end and to make the inner bearing ring or cone of the bearing adjacent to the said flange larger in internal diameter than the ring or cone of the bearing remote from said flange and the screw-threaded parts of the axle on which said cones fit of correspondingly different sizes, so that the inner rings or cones of both bearings may be removed over one end of the axle and the crank-arm thereto attached, this construction making it possible to employ an integral flange as a means of attaching a sprocket-wheel without interfering with the removal of both sets of bearing rings and cones from the shafts. The invention also embraces other improved features of construction in shaft-bearings, as will be hereinafter set forth, and particularly pointed out in the appended claims.

As shown in the accompanying drawings, Figure 1 is an axial section of a bearing-sleeve or hanger and bearings for a crank-shaft, showing the shaft itself and its integral arms in side elevation. Fig. 2 is a side view of the shaft and arms removed from the bearings. Fig. 3 is a face view of one of the arms. Fig. 4 is a face view of the sprocket-wheel, showing the same attached to the shaft. Fig. 5 is an end view of the ball-casing removed from the crank-shaft, showing the balls and caging-ring in position therein. Fig. 6 is a sectional view of a sleeve and a side elevation of the shaft and crank-arms and sprocket-wheel attached, illustrating the manner of inserting the crank-arm through the sleeve. Fig. 7 is a similar view showing a slightly-modified construction of the sleeve.

In said drawings, A designates a transverse tubular supporting-sleeve or hanger, which is secured in any desired manner to the frame-bars of the machine—as, for instance, by thimbles $a$ $a'$, made integral with the hanger. Said hanger is arranged generally in the same manner as are the similar hangers heretofore used on bicycle-frames to afford support for the bearings of the crank-shaft, which latter pass through the same.

B indicates the crank-shaft of the machine, having attached to its ends integral crank-arms $B'$ $B'$. Said crank-shaft is provided with two screw-threaded parts $b$ $b'$, adapted to afford attachment thereto of the inner bearing rings or cones of ball-bearings. Said screw-threaded parts are made larger in diameter than adjacent parts of the crank-shaft, as shown. Said crank-shaft is also provided at one end with a flange $b^2$ for the attachment of a sprocket-wheel, said flange in the instance illustrated being arranged in the same plane with the inner part of the adjacent crank-arm and being made continuous with or in the form of a flange upon the latter, as clearly shown in the drawings, Figs. 2 and 4. The screw-threaded part $b'$ of the shaft, which is adjacent to the flange $b^2$, is made somewhat larger in diameter than the screw-threaded part $b$, remote from said flange, to enable the bearing-ring which fits on the part $b'$ to pass over the part $b$, as will hereinafter more fully appear.

C indicates a sprocket-wheel, which in the instance illustrated consists of a rim C, having short inwardly-extending integral arms $c$ and flat hub C′, of annular form, which is riveted to the inner face of the flange $b^2$ of the shaft, and spokes $C^2$, which have the form of integral arms on the hub C′ and to which the rim is connected by means of bolts $c'$, passing through the outer ends of said arms and the inner ends of the arms $c$. The sprocket-wheel in itself, however, is of familiar construction, and the details illustrated form no part of my invention.

Antifriction-roller bearings for both ends of the shaft are provided, said bearings consisting of bearing-rings D D′, which are detachably secured to the ends of the sleeve A and inner bearing rings or cones, which are mounted on the shaft and secured in position thereon by having screw-threaded engagement with the screw-threaded parts $b$ $b'$ of said shaft. Said rings D D′ and E E′ are provided with opposing annular bearing-surfaces, between which are located antifriction-balls $e$, as common in such bearings. As hereinbefore stated, the screw-threaded part $b'$ of the shaft is made larger than the part $b$ thereof, so that the internal diameter of the ring E′ is greater than that of the ring E. As a consequence the said ring E′ may be slipped over or past the screw-threaded part $b$ of the shaft and engaged with the inner screw-threaded part $b'$ in assembling the parts, it being of course understood that all parts of the crank-arm outside of the screw-threaded part $b$ are made smaller in diameter than either of the rings E E′, so that both rings may be readily slipped over the same in placing them upon the shaft. This construction, therefore, obviously enables both of said bearing rings or cones to be easily applied to the shaft, notwithstanding the presence of the integral sprocket-wheel flange $b^2$ thereon.

The employment of the integral flange for attaching the sprocket-wheel to the shaft has several advantages. One of the advantages is that its use avoids the necessity of keying or otherwise securing the sprocket-wheel upon the shaft, as illustrated in said prior patent, thereby saving the additional length of shaft required outside of the bearing for the attachment of the hub of the sprocket-wheel, with the result of enabling the shaft to be made shorter and the crank to be brought closer to the bearings, and thus affording the desirable features of a short crank-shaft with a maximum distance between the bearings, it being well understood that the placing of the crank-arms as close together as possible is desirable for comfort and convenience of the rider, while the separation of the bearings as widely as possible is desirable in order to lessen the strain on the bearings and decrease the leverage of the shaft thereon. A further advantage gained by the employment of an integral flange located adjacent to the crank-arm, as described, is that it enables the periphery of the sprocket-wheel to be located approximately in the same plane with the adjacent bearing, thereby bringing the heavy strain resulting from the tensions of the drive-chain directly upon or in line with the bearing, with the result of avoiding the greater pressure on the bearings, which would result if the chain acted on a plane outside of the bearing, so as to exert a leverage thereon. The exterior rings of the ball-bearings in this instance are secured to the sleeve A by being inserted partially within the same and engaging internal screw-threads on the sleeve, said rings being extended beyond the sleeve sufficiently to provide a hold for a wrench or other implement used in inserting and removing the ring. In the particular construction illustrated the rings are provided with flanges $d\ d$, which abut against the ends of the sleeves and are provided with spanner-holes $d'$, by which they may be turned. The extension of the ring D beyond the end of the sleeve in the manner described makes the same so deep that it may receive within it the inner ring cone E and the jam-nut $e'$, by which the same is held in place, thus giving a smooth finish to the parts at the end of the sleeve opposite to that at which the sprocket-wheel is located. At the sprocket-wheel end of the shaft the inner ring or cone E′ reaches approximately to the inner surface of the sprocket-wheel hub C′, as seen in Fig. 1.

The screw-threads on the parts $b\ b'$ of the shaft are oppositely directed, or, in other words, are right and left hand threads, and the screw-threaded joints by which the outer bearing-rings D D′ are secured in the hanger are similarly made right and left handed, while the screw-threads are in all cases so arranged that the turning of the shaft will tend, in case one of the bearing-rings is held from turning (as by becoming caught by a broken ball or otherwise) and the shaft rotates therein, to carry the ring away from the balls instead of forcing it toward the same. This construction therefore avoids possibility of the bearing being injured or ruined by the forcing of the bearing-rings together, as is liable to occur in cases where the screw-threads of both bearings are right or left hand ones when one of the rings becomes caught and held from turning at a time when the pedals are being driven with great speed and power.

The operation of assembling the parts of the bearing constructed as above described is as follows: The sprocket-wheel is permanently attached to the sprocket-wheel flange before the parts are assembled. Preparatory to inserting the axle within the bearing-sleeve the bearing-cone E′ is placed on the screw-threaded part $b'$ of the axle and the external ring D′ then slipped over the axle to a point adjacent to the sprocket-wheel, as clearly shown in Fig. 6. Commonly the bend or elbow will be brought opposite one of the attaching-thimbles $a$, which latter will afford additional room for the passage of the same, as clearly seen in the drawings. After the axle has been inserted into the sleeve the ring D' is then screwed into the same, the ring D then passed over the axle-arm B' and screwed into the sleeve, and the cone E thereafter also slipped over the arm and screwed to the place upon the screw-thread $b'$.

In Fig. 7 the hanger is shown as provided with notches $a^2 a^2$, which are cut slightly into its ends to facilitate the passage of the shaft and crank-arm. Such notches do not materially affect the strength of the hanger or the security of the attachment of the bearing-rings thereto, and a construction in which such notches are present therefore comes within the scope of my invention.

I claim as my invention—

1. The combination with a machine-frame and a transverse hanger, of a crank-shaft provided with crank-arms at its ends said shaft and crank-arms being made integral with each other, said crank-shaft being provided at one end with an integral flange for the attachment of a sprocket-wheel, and bearings for the shaft comprising bearing rings or cones which are secured to the shaft said shaft having enlarged portions to receive said bearing-cones of which the enlarged portion remote from the flange is made smaller in diameter than that nearest the flange to allow the passage over it of the bearing-ring located nearest the flange whereby the parts of both bearings may be removed over the crank-arm remote from said flange.

2. The combination, with a machine-frame and a transverse tubular hanger attached to the frame, of a crank-shaft and crank-arm made integral with each other, said crank-shaft being provided at one end with an integral flange for the attachment of a sprocket-wheel, and ball-bearings for the shaft comprising inner rings or cones having screw-threaded engagement with the shaft, said shaft having screw-threaded portions to receive said bearing-cones, of which the one nearest the flange is larger in diameter than and screw-threaded oppositely to the one remote from the flange, and those parts of the shaft and crank-arms exterior to the smaller screw-threaded portion being made in all parts smaller in size than the diameter of said smaller screw-threaded part, whereby all members of both bearings may be removed over one crank-arm, substantially as described.

In testimony that I claim the foregoing as my invention I affix my signature, in presence of two witnesses, this 16th day of November, A. D. 1895.

WILLIAM H. FAUBER.

Witnesses:
 TAYLOR E. BROWN,
 WILLIAM L. HALL.